Aug. 2, 1927.  
C. H. RICHES ET AL  
1,637,427  
BAKING OVEN  
Filed March 8, 1924    2 Sheets-Sheet 2

Patented Aug. 2, 1927.

1,637,427

UNITED STATES PATENT OFFICE.

CHARLES HENRY RICHES, OF TORONTO, AND CLARENCE WILLIAM AIRD, OF BRANT-FORD, ONTARIO, CANADA, ASSIGNORS TO THE BRANTFORD OVEN & RACK CO. LIMITED, OF BRANTFORD, CANADA, A CORPORATION OF THE PROVINCE OF ONTARIO.

BAKING OVEN.

Application filed March 8, 1924. Serial No. 697,756.

This invention relates to a baking oven comprising a plurality of baking chambers and a plurality of heating chambers located one above and another below each baking chamber and separated therefrom by heat conducting bars or plates and heat storing slabs supported thereon; the object of the invention being to maintain a circulation of heated air through the baking and heating chambers and thus pevent steam and gas from settling around the baking product.

For the maintenance of this air circulation the heating chambers are connected with their respective baking chambers by vents, and the baking chambers are connected with a stack by damper controlled vents through which the heated air of any or all the baking chambers can be exhausted and the temperature of the baking chambers regulated or controlled.

In the preferred type of oven the external walls are constructed of sheet metal insulated by infusorial earth, mineral wool, or pulverized asbestos mixture or other heat non-conducting material and the heating and baking chambers are separated from each other by tile, soap stone, fire brick or other suitable heat conducting and retaining material.

For an understanding of the invention reference is to be had to the following description and to the accompanying drawings in which.

Figure 1:
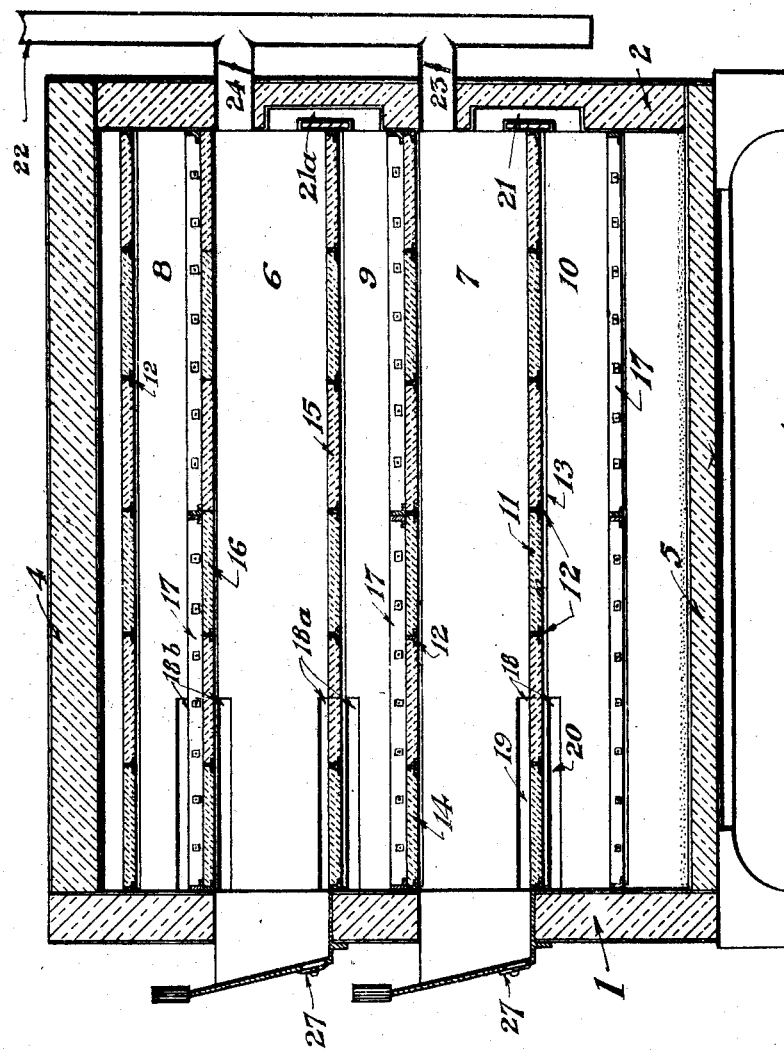
Fig. 1 is a longitudinal vertical section of the oven.
Figure 2:
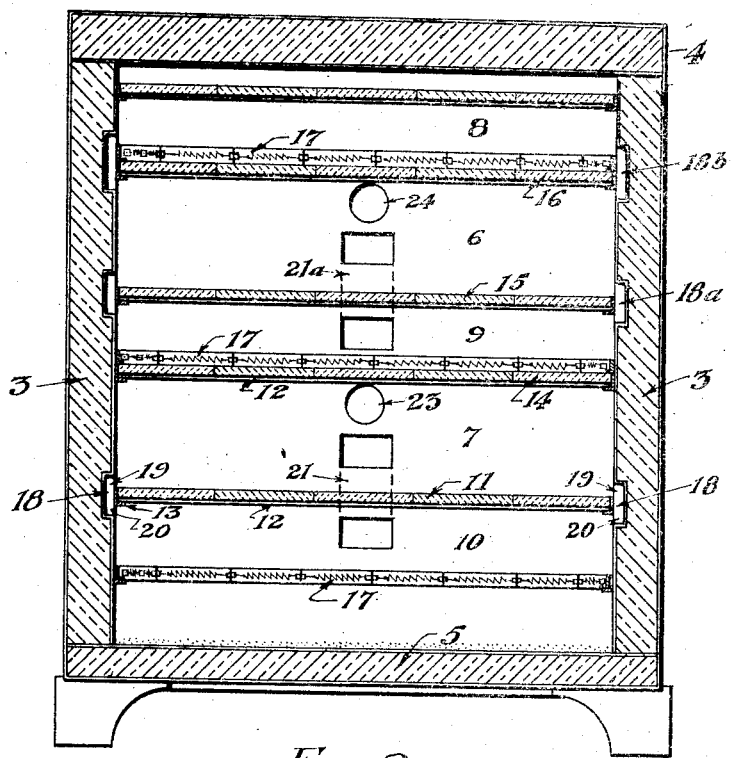
Fig. 2 is a cross sectional view of the same, showing the arrangement of baking and heating chambers, vents, and electric heating elements.
Figure 3:
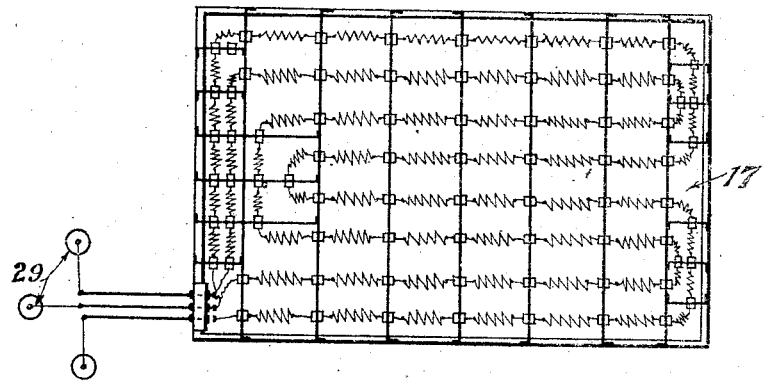
Fig. 3 is a plan view of the heating element.

The casing of the oven consists of an oven front 1, an oven back 2, side walls 3 connecting the oven front and oven back, an oven top 4 and an oven bottom 5. Each of the above parts is separable from each and all of the others and is preferably a complete unit in itself so that they can be shipped in a "knock down" condition.

The oven which may be of any usual or preferred type and can be constructed with any desired number of baking chambers and heating chambers, is shown to consist merely of two baking chambers 6 and 7 and three heating chambers 8, 9 and 10, these being sufficient for explaining the purpose and general principles of the invention. The heating chamber 10 is located at the bottom of the oven and the baking chamber 7 is immediately above this heating chamber. The baking deck 11 separating the baking chamber 7 from the heating chamber 10 is preferably composed of fire brick laid on heat conducting bars 12 supported by angle iron side rails 13 secured to the inner surfaces of the side walls 3. The top 14 of the baking chamber 7 is also constructed of fire brick laid on heat conducting bars supported by angle iron side rails similar to the bars 12 and rails 13 respectively. Above the baking chamber 7 is the heating chamber 9 and above the heating chamber 9 is the baking chamber 6 separated from the heating chamber 9 by a baking deck 15 similar to the baking deck 12 and laid on heat conducting bars supported on angle iron side rails.

The top 16 of the baking chamber 6 is similar to the top 14 of the baking chamber 7 and supported in the same manner. Above the baking chamber 6 is a heating chamber 8. In each of the heating chambers 8, 9 and 10 is a heating element 17. In the side walls 3 are vents 18 connecting the baking chamber 7 and heating chamber 10. These vents 18 are provided with openings 19 into the baking chamber 7 and with openings 20 into the heating chamber. The lower edges of the openings 19 are in substantially the same plane as the top surface of the baking deck 11. At the back of the oven are vents 21 connecting the baking chamber 7 with the heating chamber 10. The opening from the vent 21 into the baking chamber 7 is at a much higher elevation than the openings 19 and discharges heated air from the heating chamber 10 into the baking chamber 7. The heated air circulates from the vent 21 towards the front of the oven and passes through the openings 19 into the vents 18 and then through the openings 20 into the heating chamber 10 where it comes into contact with the heating element and is reheated and repeats the same course of circulation.

The baking chamber 6 is connected with the heating chamber 9 by vents 18$^a$ in the side walls and by vents 21$^a$ in the back wall for the same circulation as exists through the baking chamber 7 and heating chamber 10.

The baking chamber 6 is connected with the heating chamber 8 by vents 18ᵇ in the side walls. The oven has a stack 22 with which the baking chamber 7 is directly connected by a damper controlled vent 23, and, with which the baking chamber 6 is connected by a damper controlled vent 24. This stack may be either exterior of the oven walls or it may be arranged interiorly of the oven casing or form an integral part of one of the oven walls. When it is necessary or desired to draw off the heated air and gases from the baking chamber 7 the damper controlled vent 23 is opened to connect the baking chamber with the stack, and the air, vapor, and gases then pass from the baking chamber into the stack.

When it is desired to draw off the heated air, vapor and gases from the baking chamber 6 the damper controlled vent 24 is opened to connect the baking chamber 6 with the stack. By means of the vents 23 and 24 the temperature in the baking chambers can be regulated to the desired degree.

Each of the heating elements 17 in the heating chambers 8, 9 and 10 consists of an insulated grid wound with conductor wire of high resistance and divided into sections for varying the heat, and as is usual in electric heating elements of this class the circuit of the current is controlled through these sections by switches 29.

The baking deck 11 is heated by radiation from the heating element 17 in the heating chamber 10 and the top 14 of the baking chamber 7 is heated by radiation from the heater element 17 in the heating chamber 9. The air heated in the chamber 10 circulates through the vent 21 into the baking chamber 7 and from the baking chamber 7 returns through the vents 18 to the heating chamber 10. Likewise the decks 15 and 16 are heated by radiation from the heating element in the heating chamber 9. The air heated in the heating chamber 9 circulates through the vent 21ᵃ into the baking chamber 6 and from the baking chamber 6 returns through the vents 18ᵃ to the heating chamber 9. The heated air in the heating chamber 8 circulates through the vents 18ᵇ into the baking chamber 6 due to the pressure resulting from the increased temperature of the air in the heating chamber 8. Thus, by conduction through the baking decks, and, by convection through the circulation of the air and gases within the baking chamber, the full heating power of the element is utilized in cooking the substance of the baking product.

The oven door is provided with a damper controlled ventilator 27 for maintaining a circulation of air through the baking and heating chambers, which circulation prevents the baking product becoming heavy and sodden. In making bread the flour is required to absorb sufficient water for the expansion of the gluten to its fullest extent. When the dough is introduced into the oven the air in the baking chamber is relatively dry. The heat of the oven causes the vaporization of the water and the liberation of the gases from the dough but the circulation of the heated air through the vents causes the rapid movement of the gases and vapor so that when the baking is completed the outside of the loaf has a golden brown crust with a peculiar pungent odor.

Having thus fully described our invention what we claim as new and desire to secure by Letters Patent is:

A baking oven comprising a baking chamber, two heating chambers, one located below and separated from the baking chamber by the baking deck and the other located above the baking chamber and separated from it, an electric heating element in each heating chamber, a vent connecting the baking chamber with the heating chamber below it and provided with an opening into the baking chamber the lower edge of which is substantially in the same plane as the top surface of the baking deck, for maintaining a circulation of air from the baking chamber to the heating chamber, and a vent connecting the heating chamber with the baking chamber above it having an opening into the baking chamber above the level of the first-mentioned vent for the circulation of the heated air from the heating chamber to the baking chamber.

Signed at the said city of Toronto this twenty-first day of February, A. D. 1924.

CHARLES H. RICHES.
CLARENCE WILLIAM AIRD.